United States Patent
Kimura (10) Patent No.: US 10,911,090 B2
(45) Date of Patent: Feb. 2, 2021

(54) PORTABLE TERMINAL, AND CONTROL METHOD

(71) Applicant: SHARP KABUSHIKI KAISHA, Sakai (JP)

(72) Inventor: Kenji Kimura, Saiki (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 16/605,476

(22) PCT Filed: Apr. 11, 2018

(86) PCT No.: PCT/JP2018/015290
§ 371 (c)(1),
(2) Date: Oct. 15, 2019

(87) PCT Pub. No.: WO2018/193945
PCT Pub. Date: Oct. 25, 2018

(65) Prior Publication Data
US 2020/0127696 A1    Apr. 23, 2020

(30) Foreign Application Priority Data
Apr. 17, 2017   (JP) .................................. 2017-081585

(51) Int. Cl.
*H04B 1/38*       (2015.01)
*H04M 1/00*       (2006.01)
(Continued)

(52) U.S. Cl.
CPC ....... *H04B 1/3888* (2013.01); *G06F 3/04886* (2013.01); *G06F 3/14* (2013.01);
(Continued)

(58) Field of Classification Search
CPC ............. H04M 1/0202; H04M 1/0266; H04M 2250/22; H04B 1/3888; G09G 3/22; G09G 3/36; G09G 3/3406; G09G 5/10; G09G 2320/08; G09G 2320/0626; G09G 2360/144; G02F 1/13471; G02F 2201/50
See application file for complete search history.

(56) References Cited

U.S. PATENT DOCUMENTS 5,493,690 A * 2/1996 Shimazaki .......... H04M 1/0245
                                                          379/393
9,342,102 B2 * 5/2016 Kim ...................... G06F 1/1628
(Continued)

FOREIGN PATENT DOCUMENTS

CN      103885544 A    6/2014
JP     2013-235559 A   11/2013
(Continued)

*Primary Examiner* — Quochien B Vuong
(74) *Attorney, Agent, or Firm* — ScienBiziP, P.C.

(57) ABSTRACT

There is provided a portable terminal that combines a function of physically protecting the screen, a function of protecting privacy of display on the screen, and a function of making the screen viewable when required. A screen drawing process unit decreases viewability of at least a portion of the screen if it is determined that a flip cover having a window region that faces a touch panel and that is translucent or transparent is superposed on a display surface of a smartphone.

10 Claims, 6 Drawing Sheets

(51) Int. Cl.
*H04B 1/3888* (2015.01)
*G06F 3/0488* (2013.01)
*G06F 3/14* (2006.01)
*H04N 1/44* (2006.01)
*H04W 12/02* (2009.01)

(52) U.S. Cl.
CPC ......... *H04N 1/4486* (2013.01); *H04W 12/02* (2013.01); *G06F 2200/1634* (2013.01)

(56) References Cited

U.S. PATENT DOCUMENTS

| | | | |
|---|---|---|---|
| 9,345,299 B2* | 5/2016 | Lee | A45C 11/00 |
| 9,491,878 B2* | 11/2016 | Moon | G06F 1/1677 |
| 9,768,818 B2* | 9/2017 | Wong Chee | H04B 1/3888 |
| 10,210,975 B1* | 2/2019 | Ji | H01F 7/0273 |
| 10,341,987 B2* | 7/2019 | Kanbe | H04W 68/005 |
| 10,394,069 B2* | 8/2019 | Yamazaki | G02B 5/3016 |
| 2013/0300679 A1 | 11/2013 | Oh | |
| 2014/0198016 A1* | 7/2014 | Hunt | G09G 3/36 |
| | | | 345/5 |
| 2016/0191099 A1 | 6/2016 | Lee | |

FOREIGN PATENT DOCUMENTS

| | | |
|---|---|---|
| JP | 2016-126740 A | 7/2016 |
| JP | 2017-021673 A | 1/2017 |
| KR | 100653305 B1 * | 11/2006 |

* cited by examiner

PORTABLE TERMINAL, AND CONTROL METHOD

TECHNICAL FIELD

The present invention relates to a portable terminal, and a control method.

BACKGROUND ART

Protective casings for protecting smartphones against external shock have come into widespread use as accessories for smartphones in recent years. A type of protective casing has a booklike shape, and opening and closing of a flip cover protect a smartphone screen.

A type of protective casing that has widely been used in recent years has an opaque flip cover, and the opaque flip cover is used only for protecting the screen of a smartphone. When a user uses such a protective casing, the user cannot view the screen of a smartphone while the protective cover is closed, and this is inconvenient for the user.

A protective cover of a small window type is also known these days. A protective cover of this type has a flip cover, and a portion of the flip cover is translucent or transparent. When a user uses such a protective cover, the user can view information displayed on a portion of the screen and operate the smartphone to use some functions.

Further, a new type of protective casing whose entire flip cover is transparent (or translucent) is on the market, and a user of this type of protective casing can view the screen of a smartphone and perform touch operation while the protective cover is closed. An example of this type of protective cover is disclosed in PTL 1.

CITATION LIST

Patent Literature

PTL 1: Japanese Unexamined Patent Application Publication No. 2013-235559 (disclosed on Nov. 21, 2013).

PTL 2: Japanese Unexamined Patent Application Publication No. 2016-126740 (disclosed on Jul. 11, 2016).

PTL 3: Japanese Unexamined Patent Application Publication No. 2017-21673 (disclosed on Jan. 26, 2017)

SUMMARY OF INVENTION

Technical Problem

A protective casing whose flip cover is transparent has as a selling point a feature that allows a user to view the screen of a smartphone through the cover and operate the smartphone. However, the feature that allows a user to operate a smartphone is obtained at the cost of privacy protection because protection against a peep at the screen of a smartphone by other people, the protection being an original purpose of closing a flip cover, is lost.

A protective casing whose flip cover is opaque satisfies a need that users have in terms of privacy protection because protection against a peep at the screen of a smartphone by other people is provided. However, a user cannot view the screen while the protective cover is closed, which causes inconvenience.

A protective cover of a small window type enables display of a portion of the screen of a smartphone. However, only a fixed portion of the screen is viewable, and only some functions can be displayed.

The present invention is intended to address the above issues and to provide a portable terminal that combines a function of physically protecting the screen, a function of protecting privacy of display on the screen, and a function of making the screen viewable when required.

Solution to Problem

A portable terminal according to an aspect of the present invention includes a screen display unit that is mounted on a display surface of the portable terminal, a determining unit that determines whether a protective cover that is detachable from the display surface is superposed on the display surface, the protective cover having a portion that faces the screen display unit and that is translucent or transparent, and a display control unit that decreases viewability of at least a portion of a screen displayed by the screen display unit if it is determined that the protective cover is superposed on the display surface.

Advantageous Effects of Invention

According to an aspect of the present invention, it is possible to provide a portable terminal that combines a function of physically protecting the screen, a function of protecting privacy of display on the screen, and a function of making the screen viewable when required.

DESCRIPTION OF EMBODIMENTS

First Embodiment

A first embodiment according to the present invention will be described below with reference to FIGS. 1 to 7.

In an aspect of the present embodiment, there are provided a protective casing 2 and a smartphone 1. The protective casing 2 combines a flip cover 22 and a software process. The flip cover 22 includes a window region 25 that is translucent or transparent, and the software process controls the degree of transparency for a screen of a touch panel 11 in accordance with a user operation or a change in the state of the smartphone 1. The smartphone 1 can control the legibility and recognizability of the screen, which is viewed by a user through the flip cover 22.

(Configuration of Smartphone 1 and Protective Casing 2)

Figure 1:
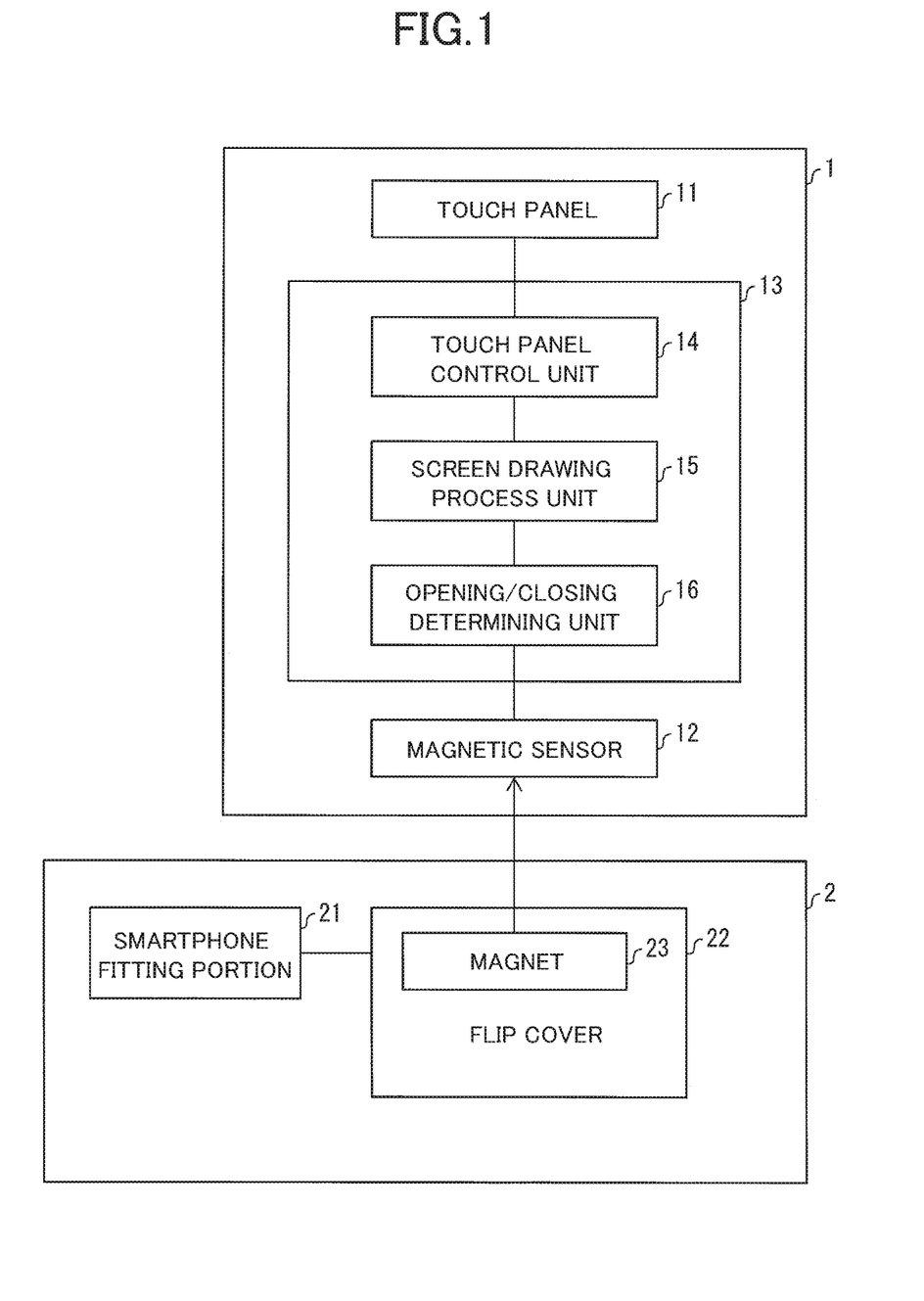
FIG. 1 as a block diagram depicting a configuration of major components of a smartphone according to a first embodiment of the present invention.
Figure 2:
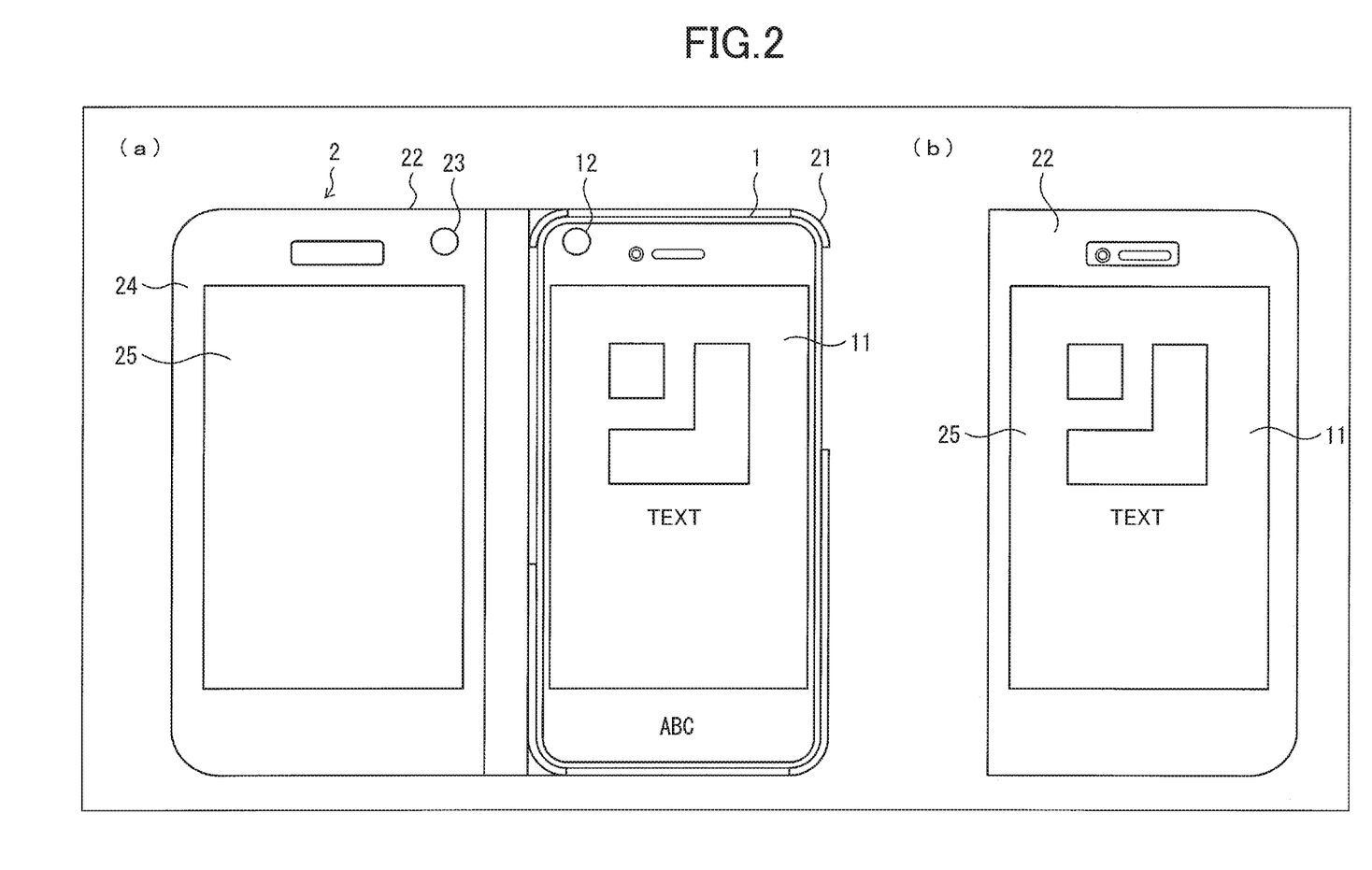
FIG. 2 is an illustration depicting opening and closing of a flip cover.

FIG. 1 is a block diagram depicting a configuration of major components of the smartphone 1 according to the first embodiment of the present invention FIG. 2 is an illustration depicting opening and closing of the flip cover 22. FIG. 2(a) represents the protective casing 2 and the smartphone 1 when the flip cover 22 is opened. FIG. 2(b) represents the protective casing 2 and the smartphone 1 when the flip cover 22 is closed.

As depicted in FIG. 1, the smartphone 1 (portable terminal) includes the touch panel 11 (screen display unit), a magnetic sensor 12, and a controller 13. The controller 13 includes a touch panel control unit 14, a screen drawing process unit 15 (display control unit), and an opening/closing determining unit 16 (determining unit).

The smartphone 1 is a kind of portable terminal that a user can carry. When the smartphone 1 is used, a user fits the smartphone 1 to the protective casing 2. A major role of the protective casing 2 is to protect the smartphone 1 against external shock.

As depicted in FIG. 1, the protective casing 2 includes a smartphone fitting portion 21, the flip cover 22 (protective cover), and a magnet 23. The smartphone fitting portion 21 is a portion used for fixing the smartphone 1 to the protective casing 2. The flip cover 22 is used for protecting the screen of the smartphone 1, has a shape suitable to flipping, and can be opened or closed. A user can freely open or close the flip cover 22 of the protective casing 2. The flip cover 22 can be superposed on or detached from the display surface of the smartphone 1. In the present embodiment, a magnetic force originating from the magnet 23 serves as notifying information indicating whether the flip cover 22 is closed. The magnet 23 serves as a component to send the notifying information to the smartphone 1.

The touch panel 11 is a device used for screen display of the smartphone 1 and for a touch input (touch operation) made on the smartphone 1 by a user. The touch panel 11 is mounted on the display surface of the smartphone 1. The magnetic sensor 12 is a sensor that detects the magnetic force originating from the magnet 23. The controller 13 controls the overall operation of the smartphone 1. The touch panel control unit 14 controls touch operation made on the touch panel 11 by a user and screen display on the touch panel 11. The screen drawing process unit 15 draws the screen of the smartphone 1. The screen of the smartphone 1 denotes the screen displayed on the touch panel 11. The opening/closing determining unit 16 determines whether the flip cover 22 is closed. The determination of whether the flip cover 22 is closed is equivalent to the determination of whether the flip cover 22 is superposed on the display surface of the smartphone 1.

The flip cover 22 includes a peripheral region 24 and the window region 25. The peripheral region 24 is disposed so as to surround the window region 25. The window region 25 is disposed so as to face the screen of the smartphone 1 when the flip cover 22 is closed. The magnet 23 is disposed in the peripheral region 24 so as to face the magnetic sensor 12 when the flip cover 22 is closed. The magnetic sensor 12 is disposed in a region surrounding the touch panel 11 (frame region) of the smartphone 1. The magnetic sensor 12 may be disposed not only at the position depicted in FIG. 2 but also at any position where the magnetic sensor 12 can be placed in the smartphone 1. The position where the magnet 23 is placed is determined appropriately in accordance with the position where the magnetic sensor 12 is placed in the smartphone 1.

The peripheral region 24 is made of a light blocking material. The window region 25 is made of a material that enables a user to make a touch operation on the touch panel 11 through the window region 25 when the window region 25 is superposed on the touch panel 11. The material used for the window region 25 is translucent, or desirably transparent.

When the flip cover 22 is opened as depicted in FIG. 2(a), the flip cover 22 is not superposed on the display surface of the smartphone 1. In other words, nothing is on or above the touch panel 11 to block the screen displayed on the touch panel 11. Consequently, a user can view the screen of the smartphone 1. When the flip cover 22 is closed as depicted in FIG. 2(b) and the window region 25 is superposed on the touch panel 11, the screen displayed on the touch panel 11 is not blocked by the window region 25 because the window region 25 is translucent or transparent. Consequently, a user can view the screen of the smartphone 1 through the window region 25.

(Process for Decreasing Viewability of Screen)

Figure 3:
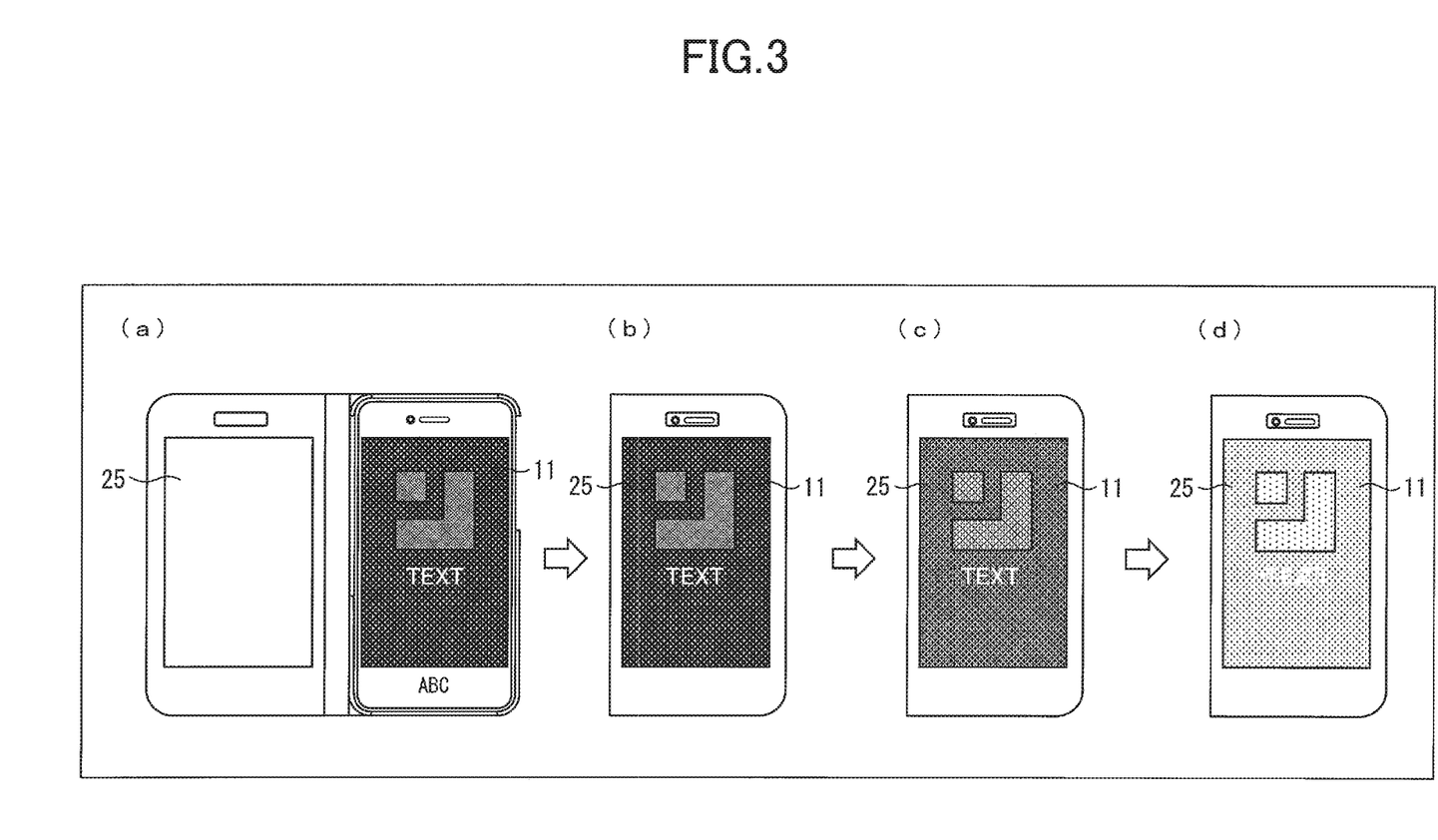
FIG. 3 is an illustration depicting a decrease in viewability of the screen of the smartphone after the flip cover is closed.

FIG. 3 is an illustration depicting a decrease in viewability of the screen of the smartphone 1 after the flip cover 22 is closed. In FIG. 3(a), the flip cover 22 is opened. When a user closes the flip cover 22, the window region 25 is superposed on the touch panel 11 as depicted in FIG. 3(b). At this point, the smartphone 1 has yet to control the viewability of the screen. Thus, the user can view the screen through the window region 25.

When the flip cover 22 is closed, the magnetic sensor 12 detects the magnetic force originating from the magnet 23. The opening/closing determining unit 16 determines that the flip cover 22 is superposed on the display surface in accordance with the detection of the magnetic force, which originates from the magnet 23 and is detected by the magnetic sensor 12. In accordance with the determination result, the screen drawing process unit 15 decreases the viewability of the screen of the smartphone 1 in a stepwise manner as time passes.

When a certain amount of time passes after the determination of superposition, the screen drawing process unit 15 decreases the viewability of the screen to a level such that the user has difficulty in recognizing text information in the screen as depicted in FIG. 3(c). When a certain amount of time further passes after the decrease in viewability depicted in FIG. 3(c), the screen drawing process unit 15 further decreases the viewability of the screen to a level such that the user cannot recognize text information in the screen as depicted in FIG. 3(d). Consequently, the flip cover 22 not only physically protects the screen, but also protects privacy of the screen.

The screen area where viewability is decreased is not limited to the entire screen. The screen drawing process unit 15 can decrease viewability of at least a portion of the screen. For example, the screen drawing process unit 15 does not decrease viewability of the area in the screen where a clock is displayed and decreases viewability of the other area. Alternatively, the screen drawing process unit 15 does not decrease viewability of the upper area in the screen where information such as the remaining battery level of the smartphone 1 is displayed and decreases viewability of the other area.

(Restoration of Viewability Due to Opening of Cover)

Figure 4:
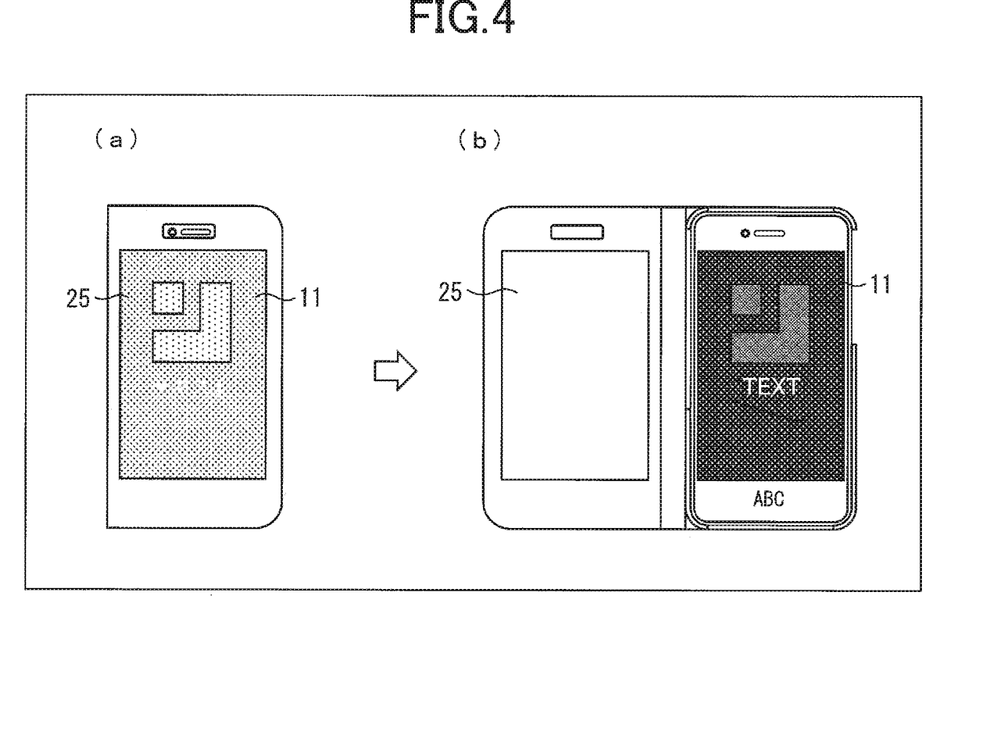
FIG. 4 is an illustration depicting restoration of viewability of the screen of the smartphone after the flip cover is opened.

FIG. 4 is an illustration depicting restoration of viewability of the screen of the smartphone 1 after the flip cover 22 is opened In FIG. 4(a), the flip cover 22 is closed, and the viewability of the screen is so low that a user cannot recognize text information in the screen. When the user opens the flip cover 22, the window region 25 is detached from the touch panel 11 as depicted in FIG. 4(b). Consequently, the magnet 23 is detached from the magnetic sensor 12, and thus the magnetic sensor 12 ceases detecting the magnetic force originating from the magnet 23.

The opening closing determining unit 16 determines afresh that the flip cover 22 is opened in accordance with the cessation of detection. In accordance with the determination result, the screen drawing process unit 15 restores the viewability of the screen of the smartphone 1 as depicted in FIG. 4(b). Consequently, the viewability of the screen returns to the normal level of viewability, which is attained before the flip cover 22 is closed. The user can view the screen whose viewability has been restored.

Figure 5:
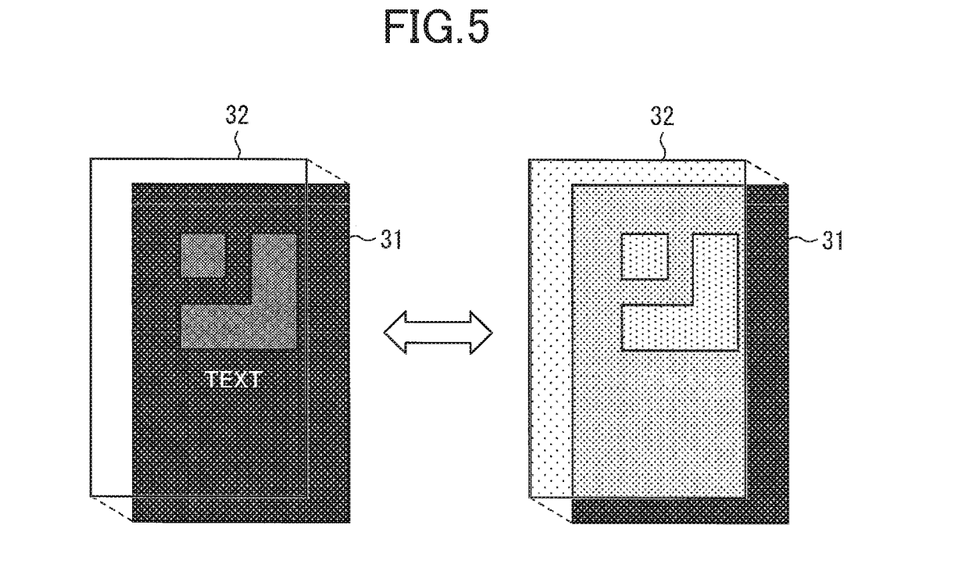
FIG. 5 is an illustration depicting a lower layer and an upper layer to achieve viewability control of the screen.

FIG. 5 is an illustration depicting a lower layer 31 and an upper layer 32 to achieve viewability control of the screen. The lower layer 31 is a layer used for displaying a normal image. The upper layer 32 is a layer that is disposed on or above the lower layer 31 and that is used for displaying a special image to control the viewability of the screen. In the present embodiment, the screen drawing process unit 15 displays on the upper layer 32 an image representing a degree of opacity of the screen and superposes the image on the normal image displayed on the lower layer 31. The screen drawing process unit 15 draws the screen of the smartphone 1 in this way.

The screen drawing process unit 15 varies the degree of transparency of the image on the upper layer 32 and thus controls the viewability of the screen. For example, the screen drawing process unit 15 reduces the degree of transparency of the image on the upper layer 32 and thus can decrease the viewability of the screen. The image on the lower layer 31 remains unchanged at this time. Consequently, when viewing the screen, a user can recognize an unclear state of the screen, presence of notification sent to the user, or the like. The smartphone 1 can display an image on the upper layer 32 in a manner such that the user cannot recognize detailed text information or the like. Consequently, protection of privacy of the screen can be made effective. If the degree of transparency of the image on the upper layer 32 is reduced to, for example, 94% (240th stage of 255 stages), the screen drawing process unit 15 can decrease the viewability of the screen to a level such that detailed text information or the like is unrecognizable.

After the degree of transparency of the image on the upper layer 32 is reduced, the screen drawing process unit 15 can restore the degree of transparency of the image on the upper layer 32 and thus can restore the viewability of the screen. Also at this time, the image on the lower layer 31 remains unchanged.

The image area where the degree of transparency is reduced on the upper layer 32 is not limited to the entire image. The screen drawing process unit 15 can reduce the degree of transparency of at least a portion of the image on the upper layer 32. Consequently, the viewability of a desired area in the screen can be decreased.

(Restoration of Viewability Due to User Operation)

Figure 6:
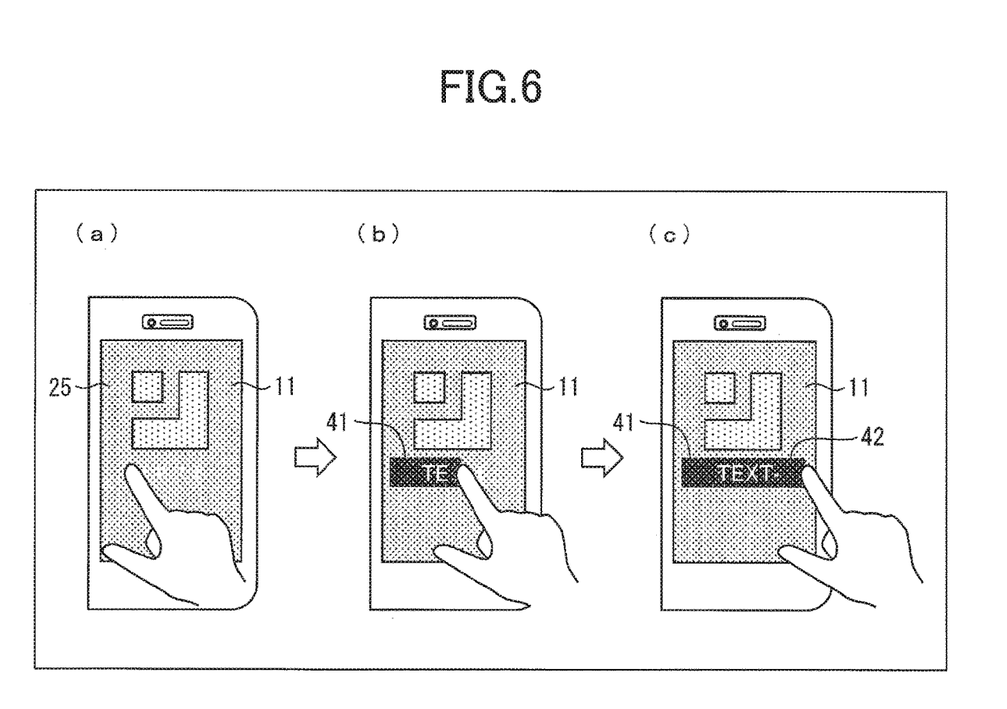
FIG. 6 is an illustration depicting restoration of viewability of a position where a touch input by a user is received in the screen.

FIG. 6 is an illustration depicting restoration of viewability of a position where a touch input by a user is received in the screen. The smartphone 1 restores the viewability of an area subjected to user operation in accordance with the user operation on the screen of the touch panel 11 (for example, an operation such as tracing any area in the screen with a finger) Consequently, any area in the screen that a user wants to view can be made viewable.

In FIG. 6(a), the flip cover 22 is closed, and the viewability of the screen is so low that a user cannot recognize text information in the screen. When the user traces an area 41 in the screen with a finger, the touch panel control unit 14 detects the operation as a touch input to the touch panel 11 by the user. The screen drawing process unit 15 restores the viewability of the area 41, which corresponds to a position of the detected touch input, as depicted in FIG. 6(b). Consequently, the user can view information displayed in the area 41.

When the user traces an area 42 after tracing the area 41, the touch panel control unit 14 detects the operation as a new touch input to the touch panel 11 by the user. The screen drawing process unit 15 restores the viewability of the area 42, which corresponds to a position of the detected touch input, as depicted in FIG. 6(c). The screen drawing process unit 15 retains the viewability of the area 41 as restored. Consequently, the user can view information displayed in the area 41 and the area 42.

(Recurrence of Decrease in Viewability)

Figure 7:
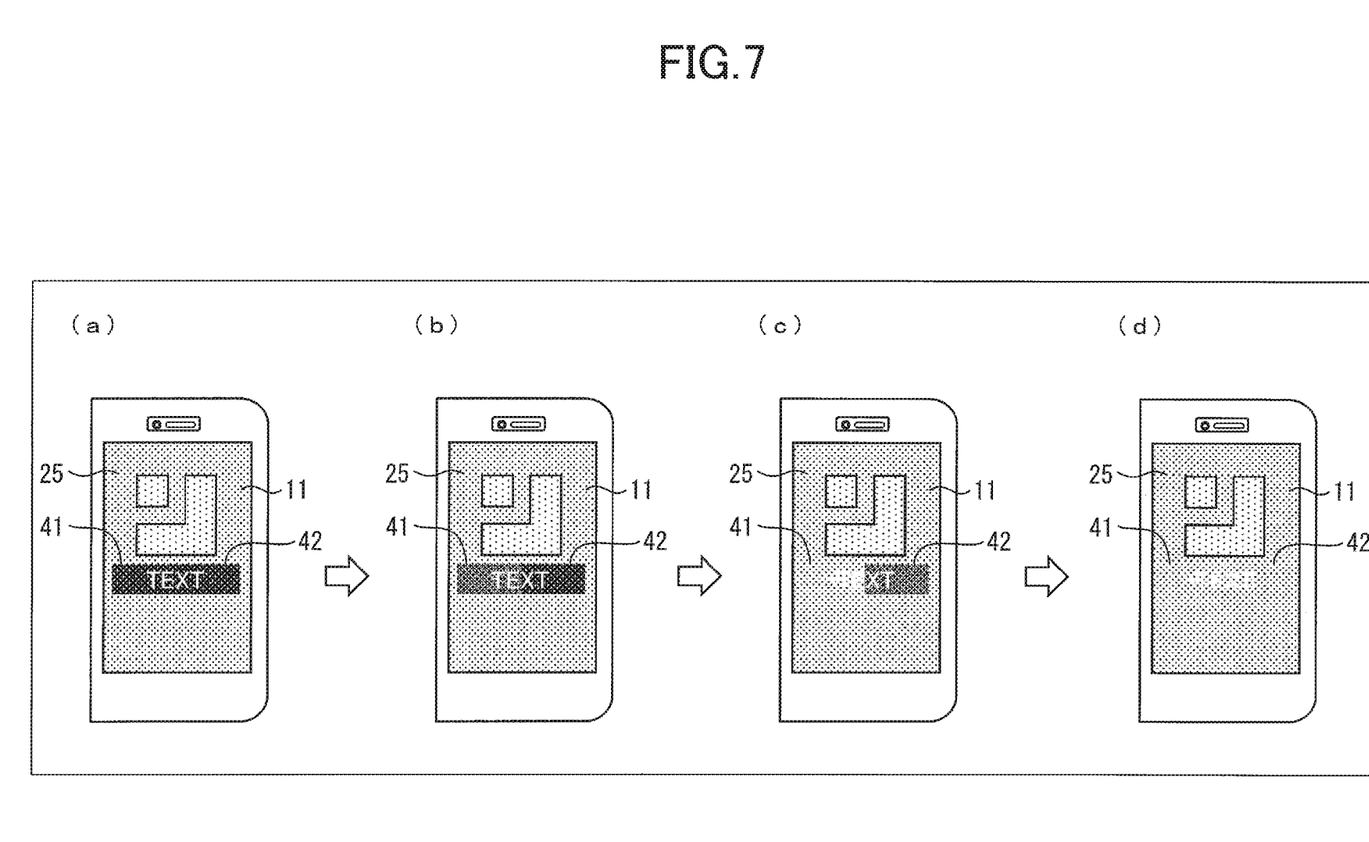
FIG. 7 is an illustration depicting how the viewability decreases again after the viewability is restored by the touch input by the user.

FIG. 7 is an illustration depicting how the viewability decreases again after the viewability is restored by the touch input by the user. The smartphone 1 restores the viewability of the area subjected to the user operation and then automatically decreases the viewability of the area. Consequently, protection of privacy of the screen can be made effective again.

In FIG. 7(a), the viewability of the area 41 and the area 42, which are the areas traced by the user, is restored. When a certain amount of time passes after the viewability of the area 41 is restored, the screen drawing process unit 15 decreases the viewability of the area 41 again to a level such that the user has difficulty in recognizing text information in the screen as depicted in FIG. 7(b). At this time, the viewability of the area 42 remains unchanged after the restoration.

Subsequently, when a certain amount of time passes further, the screen drawing process unit 15 decreases the viewability of the area 41 further to a level such that the user cannot recognize text information in the screen as depicted in FIG. 7(c). Further, the screen drawing process unit 15 decreases the viewability of the area 42 again to a level such that the user has difficulty in recognizing text information in the screen.

Subsequently, when a certain amount of time passes further, the screen drawing process unit 15 decreases the viewability of the area 42 again to a level such that the user cannot recognize text information in the screen as depicted in FIG. 7(d). Consequently, the viewability of the entire screen returns to the viewability attained before the user traces the screen.

Second Embodiment

The smartphone 1 according to the present embodiment includes grip sensors, which are not depicted. A grip sensor is a sensor that detects a grip on the smartphone 1 by a user. A grip sensor is disposed on the left of the body of the smartphone 1, and another grip sensor is disposed on the right of the body of the smartphone 1. The opening/closing determining unit 16 determines whether the flip cover 22 is opened or closed in accordance with a detection result obtained by the grip sensors instead of a detection result obtained by the magnetic sensor 12. Accordingly, the protective casing 2 need not include the magnet 23.

Third Embodiment

The smartphone 1 according to the present embodiment displays on the screen an icon for reporting to the smartphone 1 whether the flip cover 22 is opened or closed. Detection of a touch input to the icon by a user serves as a replacement for the detection of the magnetic force from the magnet 23 by the magnetic sensor 12. Namely, the opening/closing determining unit 16 determines whether the flip cover 22 is opened or closed in accordance with a detection result of a touch input to the icon instead of a detection result obtained by the magnetic sensor 12. The smartphone 1 need not include the magnetic sensor 12, and the protective casing 2 need not include the magnet 23. A grip sensor as in the second embodiment is also unnecessary. According to the present embodiment, the configuration of the smartphone 1 and the protective casing 2 can further be simplified.

[Example Realized by Using Software]

The control block of the smartphone 1 (in particular, the touch panel control unit 14, the screen drawing process unit 15, and the opening/closing determining unit 16) may be realized by using logical circuits (hardware) formed on an integrated circuit (IC) chip or the like or may be realized by using software executed by a central processing unit (CPU).

In the latter case, the smartphone 1 includes a CPU, a read-only memory (ROM) or a storage device (referred to as a "recording medium"), a random-access memory (RAM), and the like. The CPU executes commands in a program, which is software to realize each function. The recording medium records the program and various kinds of data in a form readable by a computer (or a CPU). The program is loaded into the RAM. The computer (or the CPU) reads the program from the recording medium and executes the program, and thus a purpose of the present invention is achieved. As the recording medium, a "non-transitory physical medium", such as a tape, a disc, a card, a semiconductor memory, and a programmable logic circuit can be used. The program may also be provided to the computer via any transmission medium (such as a communication network and a broadcasting wave) that can transmit the program. An aspect of the present invention can also be realized in a form of a data signal embedded in a carrier wave, the data signal representing the program by using electronic transmission.

SUMMARY

A portable terminal according to a first aspect of the present invention includes a screen display unit that is mounted on a display surface of the portable terminal, a determining unit that determines whether a protective cover that is detachable from the display surface is superposed on the display surface, the protective cover having a portion that faces the screen display unit and that is translucent or transparent, and a display control unit that decreases viewability of at least a port ion of a screen displayed by the screen display unit if it is determined that the protective cover is superposed on the display surface.

According to the above configuration, it is possible to provide a portable terminal that combines a function of physically protecting the screen, a function of protecting privacy of display on the screen, and a function of making the screen viewable when required.

In the portable terminal according to a second aspect of the present invention, after decreasing viewability of the screen, the display control unit in the first aspect restores viewability of the screen if it is determined afresh that the protective cover is not superposed on the display surface.

According to the above configuration, when the screen needs no protection, a user is allowed to view the screen.

In the portable terminal according to a third aspect of the present invention, the display control unit in the first aspect or the second aspect decreases viewability of the screen in a stepwise manner as time passes if it is determined that the protective cover is superposed on the display surface.

According to the above configuration, a user can be informed that protection of privacy becomes effective.

In the portable terminal according to a fourth aspect of the present invention, the protective cover in any one of the first aspect to the third aspect has a section for sending, to the portable terminal, notifying information indicating whether the protective cover is superposed on the display surface, and the determining unit in any one of the first aspect to the third aspect determines whether the protective cover is superposed on the display surface in accordance with the notifying information sent by the section.

According to the above configuration, whether the protective cover is superposed on the portable terminal can easily be determined.

In the portable terminal according to a fifth aspect of the present invention, the section in the fourth aspect is a magnet.

According to the above configuration, the configuration of the protective cover can be simplified.

In the portable terminal according to a sixth aspect of the present invention, the screen display unit in any one of the first aspect to the fifth aspect further includes a function to detect a touch input by a user, and when the touch input is detected, the display control unit in any one of the first aspect to the fifth aspect restores the viewability at a position of the touch input in the screen.

According to the above configuration, a user can view a desired area in the screen.

In the portable terminal according to a seventh aspect of the present invention, after restoring the viewability at the position, the display control unit in the sixth aspect decreases the viewability at the position again.

According to the above configuration, protection of privacy can be made effective again.

A control method according to an eighth aspect of the present invention is a method for controlling a portable terminal that includes a screen display unit mounted on a display surface of the portable terminal, and the control method includes a determining step of determining whether a protective cover that is detachable from the display surface is superposed on the display surface, the protective cover having a portion that faces the screen display unit and that is translucent or transparent, and a display control step of decreasing viewability of at least a portion of a screen displayed by the screen display unit if it is determined that the protective cover is superposed on the display surface.

According to the above configuration, it is possible to cause the portable terminal to combine a function of physically protecting the screen, a function of protecting privacy of display on the screen, and a function of making the screen viewable when required.

A portable terminal according to each of the aspects of the present invention may be realized by using a computer. In such a case, a program for a portable terminal causes a computer to operate as each unit (software element) included is the portable terminal and thus realizes the portable terminal by using the computer. Such a program and a computer-readable recording medium that records such a program are also included within the scope of the present invention.

The present invention is not limited to the embodiments described above, and various modifications are possible within the scope defined in the claims. An embodiment obtained by appropriately combining technical methods disclosed in each of the different embodiments is also within the technical scope of the present invention. Combining technical methods disclosed in each of the embodiments can produce a new technical feature.

The invention claimed is:

1. A portable terminal comprising:
a screen display unit that is mounted on a display surface of the portable terminal;
a determining unit that determines whether a protective cover that is detachable from the display surface is superposed on the display surface, the protective cover having a portion that faces the screen display unit and that is translucent or transparent; and
a display control unit that decreases viewability of at least a portion of a screen displayed by the screen display unit to display a screen on the screen display unit with viewability decreased to a level such that a user cannot recognize text information that has been displayed on the screen if it is determined that the protective cover is superposed on the display surface.

2. The portable terminal according to claim 1,
wherein after decreasing viewability of the screen, the display control unit restores viewability of the screen if it is determined afresh that the protective cover is not superposed on the display surface.

3. The portable terminal according to claim 1,
wherein the display control unit decreases viewability of the screen in a stepwise manner as time passes if it is determined that the protective cover is superposed on the display surface.

4. The portable terminal according to claim 1,
wherein the protective cover has a section for sending, to the portable terminal, notifying information indicating whether the protective cover is superposed on the display surface, and
the determining unit determines whether the protective cover is superposed on the display surface in accordance with the notifying information sent by the section.

5. The portable terminal according to claim 4,
wherein the section is a magnet.

6. The portable terminal according to claim 1,
wherein the screen display unit further includes a function to detect a touch input by a user, and
when the touch input is detected, the display control unit restores the viewability at a position of the touch input in the screen.

7. The portable terminal according to claim 6,
wherein after restoring the viewability at the position, the display control unit decreases the viewability at the position again.

8. The portable terminal according to claim 1,
wherein the display control unit decreases viewability of only a portion of a screen displayed by the screen display unit.

9. A control method for a portable terminal that includes a screen display unit mounted on a display surface of the portable terminal, the control method comprising:
a determining step of determining whether a protective cover that is detachable from the display surface is superposed on the display surface, the protective cover having a portion that faces the screen display unit and that is translucent or transparent; and
a display control step of decreasing viewability of at least a portion of a screen displayed by the screen display unit to display a screen on the screen display unit with viewability decreased to a level such that a user cannot recognize text information that has been displayed on the screen if it is determined that the protective cover is superposed on the display surface.

10. The control method for a portable terminal to claim 9,
wherein in the display control step, viewability is decreased only a portion of a screen displayed by the screen display unit.

* * * * *